United States Patent [19]
Zanetel et al.

[11] Patent Number: 5,518,098
[45] Date of Patent: May 21, 1996

[54] DUAL FLOW CONTROL FOR HYDRAULIC CLUTCH

[75] Inventors: G. Paul Zanetel, Winnipeg; Allan N. Schott, Warren, both of Canada

[73] Assignee: New Holland North America, Inc., New Holland, Pa.

[21] Appl. No.: 353,229

[22] Filed: Dec. 1, 1994

[51] Int. Cl.⁶ .................................................. F16D 13/74
[52] U.S. Cl. ................... 192/113.35; 192/113.31; 192/70.12
[58] Field of Search ............ 192/113.35, 113.31, 192/113.3, 70.12, 12 C

[56] References Cited

U.S. PATENT DOCUMENTS

| | | | |
|---|---|---|---|
| 3,105,582 | 10/1963 | Ziabicki | 192/13.35 |
| 3,995,727 | 12/1976 | Ivey | 192/113.35 |
| 4,004,670 | 1/1977 | Nerstad et al. | 192/113.35 X |
| 4,029,189 | 6/1977 | Freiburger | 192/113.35 |
| 4,134,483 | 1/1979 | Horsch | 192/113.35 |
| 4,157,750 | 6/1979 | Horsch | 192/113.35 |
| 4,557,363 | 12/1985 | Golan | 192/70.12 X |
| 4,753,332 | 6/1988 | Bieber et al. | 192/70.12 |
| 4,856,628 | 8/1989 | Momiyama | 192/70.12 X |
| 4,860,873 | 8/1989 | Inagaki et al. | 192/70.12 X |

*Primary Examiner*—Andrea L. Pitts
*Attorney, Agent, or Firm*—Larry W. Miller; Frank A. Seemar

[57] ABSTRACT

A hydraulic circuit for lubricating a tractor transmission and associated master clutch is disclosed wherein a high cooling flow of lubrication oil is delivered to the master clutch whenever the clutch is being modulated, but a normal lower oil flow is delivered to the clutch whenever the clutch is either disengaged or fully engaged. The hydraulic circuit includes a clutch lubrication control spool operatively associated with a pilot line sensing pressure from the hydraulic system controlling the application of the master clutch and a transmission brake that is engaged to stop the transmission when the master clutch is disengaged. The pilot line controls the positioning of the clutch lubrication control spool to shift the spool to a high flow position whenever less than full pressure is sensed in either the clutch applied or brake applied hydraulic lines.

9 Claims, 4 Drawing Sheets

DUAL FLOW CONTROL FOR HYDRAULIC CLUTCH

BACKGROUND OF THE INVENTION

This invention relates generally to off-road motor vehicles, such as tractors, and more particularly, to a hydraulic clutch operatively connected to a transmission to control the output thereof.

Tractor transmissions are typically provided with a master clutch operatively connecting the output of the engine to the transmission. This master clutch can be modulated under full power from the engine to provide a limited transfer of operative power to the transmission, and therefore to the operatively connected drive wheels, through a process typically referred to as "inching". Modulation of the master clutch creates heat which must be accommodated to prevent destruction of the clutch. To cool the clutch, a high flow of lubricating oil can be passed through the clutch to dissipate the heat; however, a high oil flow is not desirable under normal operating conditions as the oil can be better utilized in other parts of the transmission lubrication circuit.

Accordingly, it would be desirable to provide a hydraulic circuit for the lubrication of a transmission and master clutch that will provide a high flow of oil through the clutch whenever the clutch is being modulated, but provides only a normal low oil flow whenever the clutch is disengaged or whenever the clutch is fully engaged and is not being modulated.

SUMMARY OF THE INVENTION

It is an object of this invention to overcome the aforementioned disadvantages of the prior art by providing a hydraulic circuit to provide a high cooling flow of lubricating oil only when the clutch is being modulated.

It is another object of this invention to provide a transmission lubrication circuit that provides a normal low flow of lubrication oil to the clutch whenever the clutch is either disengaged or fully engaged, yet provides a high cooling flow of oil whenever the clutch is being modulated.

It is a feature of this invention that the lubrication circuit provides an oil flow rate of approximately 50 to 60 liters per minute to the master clutch while being modulated, and provides an oil flow rate of approximately 10 to 20 liters per minute when the clutch is not being modulated.

It is an advantage of this invention that a high flow of lubrication oil is not creating an internal drag torque in the clutch whenever the clutch is disengaged.

It is another advantage of this invention that the hydraulic lubrication circuit automatically changes to a high oil flow rate whenever the master clutch is modulated.

It is another feature of this invention that the hydraulic circuit shifts a clutch lubrication control spool by a change in pilot pressure.

It is still another feature of this invention that the pilot pressure in the hydraulic circuit comes from a "clutch applied" hydraulic line when the clutch is fully engaged and from a "brake applied" hydraulic line whenever the clutch is disengaged.

It is yet another feature of this invention that the absence of full hydraulic pressure in either the "clutch applied" hydraulic line or in the "brake applied" hydraulic line while the clutch is being modulated effects a shifting of the clutch lubrication control spool to send a high flow of lubrication oil into the clutch.

It is yet another object of this invention to provide a hydraulic circuit for lubricating a tractor transmission and associated master clutch which is durable in construction, inexpensive of manufacture, carefree of maintenance, facile in assemblage, and simple and effective in use.

These and other objects, features and advantages are accomplished according to the instant invention by providing a hydraulic circuit for lubricating a tractor transmission and associated master clutch wherein a high cooling flow of lubrication oil is delivered to the master clutch whenever the clutch is being modulated, but a normal lower oil flow is delivered to the clutch whenever the clutch is either disengaged or fully engaged. The hydraulic circuit includes a clutch lubrication control spool operatively associated with a pilot line sensing pressure from the hydraulic system controlling the application of the master clutch and a transmission brake that is engaged to stop the transmission when the master clutch is disengaged. The pilot line controls the positioning of the clutch lubrication control spool to shift the spool to a high flow position whenever less than full pressure is sensed in either the clutch applied or brake applied hydraulic lines.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
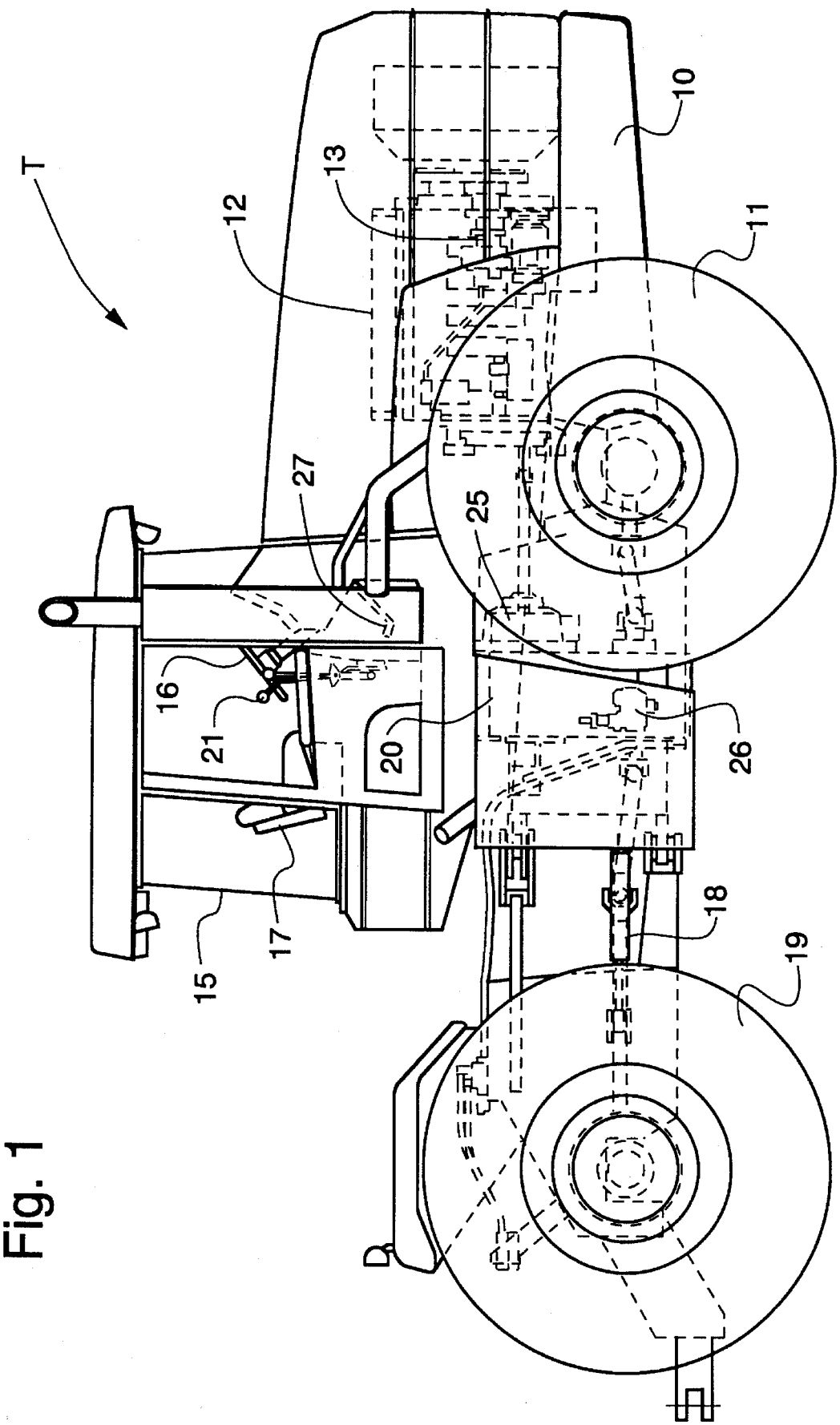
FIG. 1 is a side elevational view of a tractor incorporating the principles of the instant invention.

Referring now to the drawings and, particularly, to FIG. 1, a representative view of an agricultural tractor incorporating the principles of the instant invention can best be seen. Left and right references are used as a matter of convenience and are determined by standing at the rear of the tractor and facing the forward end in the normal direction of travel. The tractor chassis 10 is supported above the ground in a conventional manner by front wheels 11, which on large tractors are typically drivingly powered, and rearward drive wheels 19 rotatably mounted in a customary transversely spaced orientation.

The chassis supports a conventional engine 12 serving to provide operational power for the tractor T and an operator's cab 15 positioned in an elevated location. The operator's cab 15 includes a steering wheel 16, positioned forwardly of the conventional operator's seat 17, to operate the steering of the front wheels 11 through manipulation of the hydraulic cylinder 18 controlling the articulation of the tractor chassis 10 in a known conventional manner. The operator's cab 15 is also provided with conventional operative controls, such as the transmission control lever 21, to permit the operative control of the tractor T.

The tractor T is provided with a transmission 20 supported on the chassis 10 to receive rotational power from the engine 12 and transfer rotational power to the front and rear wheels 11, 19 at selected speeds of operation. The transmission control lever 21, which is mounted in the operator's cab 15 within normal reach of the operator's seat 17, effects a shifting of the available speeds of operation through a conventional push/pull cable (not shown). The transmission 20 is described in greater detail in co-pending U.S. patent application Ser. No. 08/ , of Allan N. Schott, entitled "Tractor Transmission Shift Fork Assembly" and filed concurrently herewith, the descriptive portions of which are incorporated herein by reference.

A master clutch 25 is mounted on the transmission 20 and is operatively associated therewith to control the application of operative power from the engine 12 to the transmission 20 in a conventional manner. The master clutch 25 is hydraulically controlled through the operation of the control valve 26, which is also mounted on the transmission 20 in a manner described in greater detail below and is operated in a conventional manner by the clutch pedal 27 located in the operator's cab 15. The engine 12 supports an oil pump 13 connected in flow communication with the various hydraulic components by lines (not shown) to provide a source of hydraulic fluid under pressure.

Figure 2:
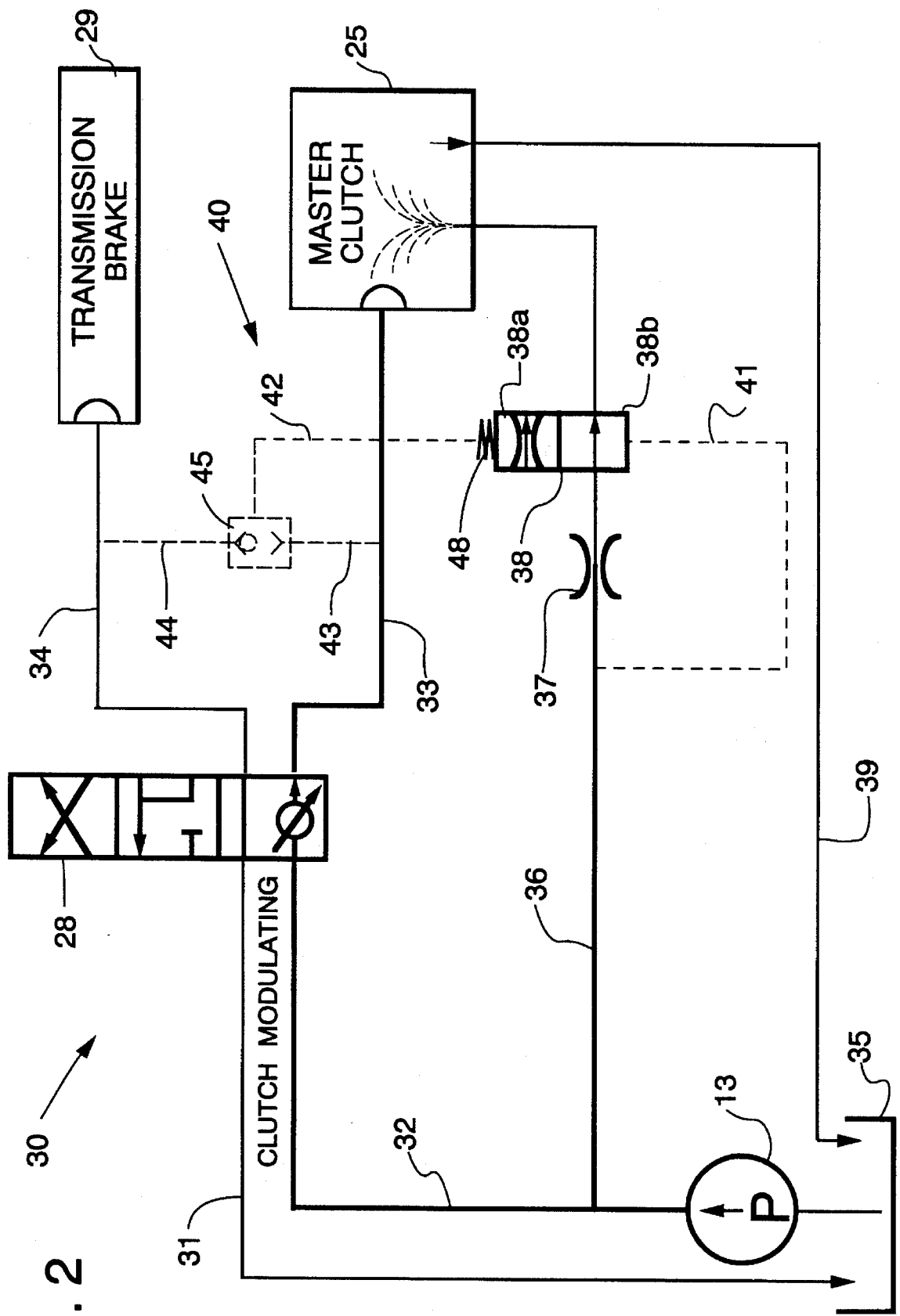
FIG. 2 is a schematic diagram of the hydraulic circuit incorporating the principles of the instant invention, the master clutch being modulated to effect a high lubrication flow into the master clutch.
Figure 3:
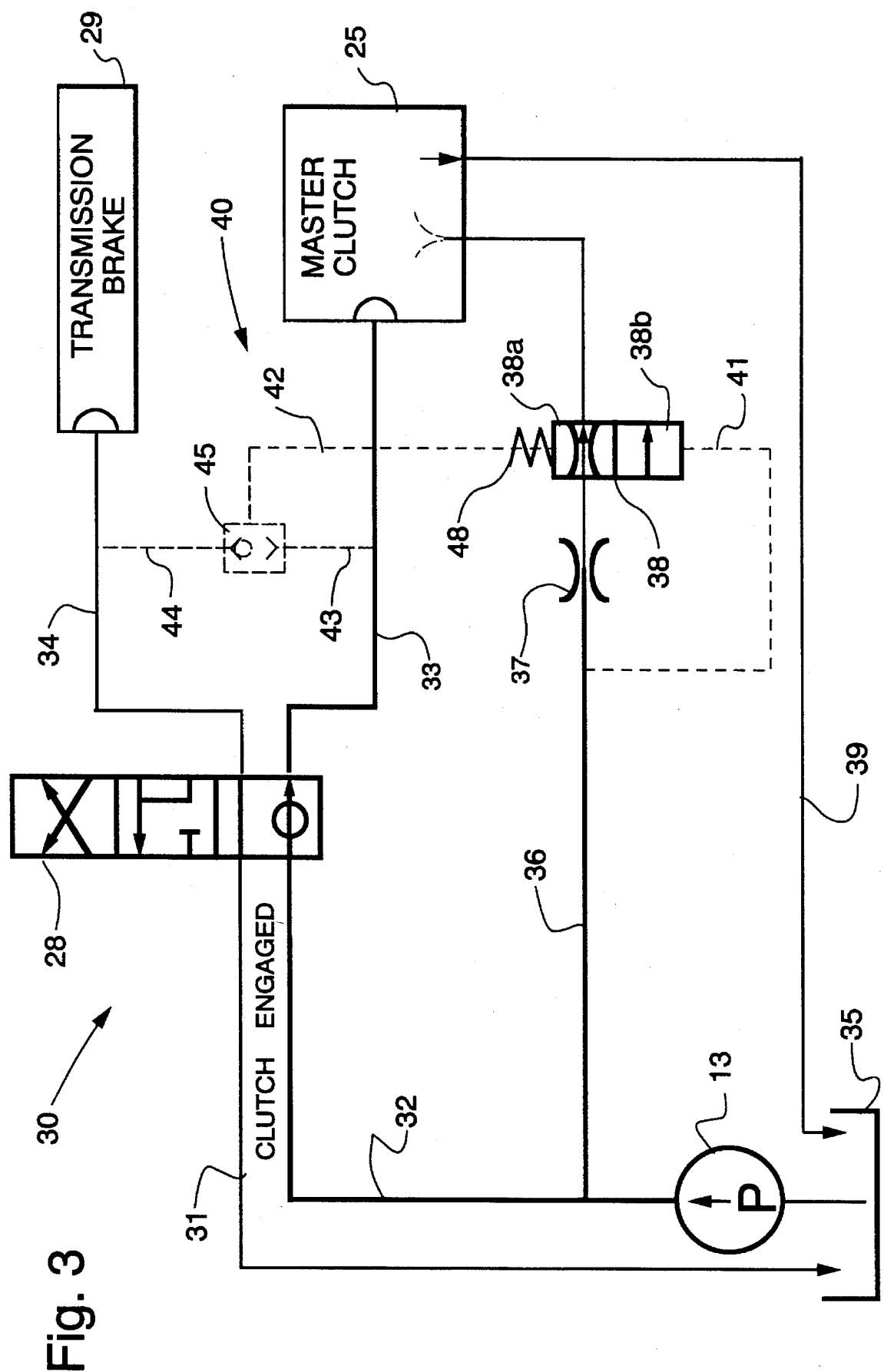
FIG. 3 is a schematic diagram of the hydraulic circuit shown in FIG. 2 with the master clutch being fully engaged to effect a normal low lubrication flow into the master clutch.
Figure 4:
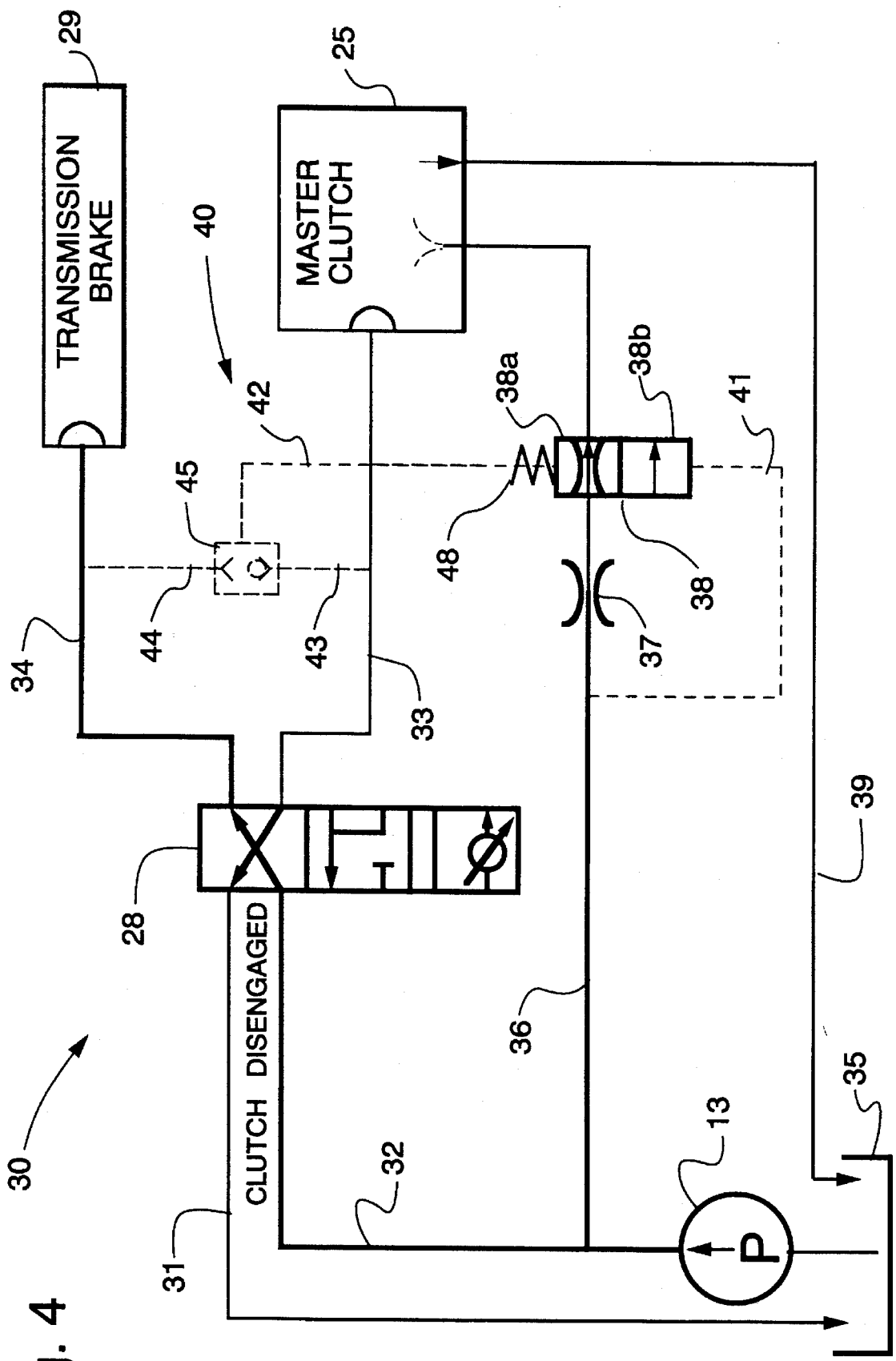
FIG. 4 is a schematic diagram of the hydraulic circuit shown in FIG. 2 with the master clutch being disengaged and the transmission brake fully engaged to effect a normal low lubrication flow into the master clutch.

Referring now to the schematic diagrams of FIGS. 2–4, the details of the master clutch hydraulic lubrication circuit 30 can best be seen. The oil pump 13 provides a source of hydraulic fluid under pressure via a first supply line 32 into the master clutch control spool 28 forming a part of the master clutch control valve 26. The spool 28 is shiftable in two positions, a clutch engagement position and a clutch disengage position, with a third intermediate position therebetween serving only the purpose of dumping the pressure from the system to prevent an instantaneous switching in pressures, as will be described in greater detail below.

The spool 28 is operable to direct the flow of hydraulic oil under pressure to either a master clutch applied line 33 or a transmission brake applied line 34, depending on whether the spool 28 is in the clutch engagement position shown in FIGS. 2 and 3 or in the clutch disengage position shown in FIG. 4. A return line 31 directs the return flow of hydraulic fluid back to the tank 35. The intermediate spool position dumps the hydraulic pressure of both the master clutch 25 and the transmission brake 29 back to the tank 35 as the spool 28 is shifted between the clutch engagement and clutch disengaged positions. The conventional transmission brake 29, schematically shown in FIGS. 2–4, is housed internally of the transmission 20 and serves to stop the rotational movement of the components within the transmission 20 when the master clutch 25 is disengaged to facilitate the shifting of gears within the transmission 20, as is known in the art.

The pump 13 also supplies hydraulic fluid under pressure to a lubrication supply line 36 to deliver a flow of oil through a clutch lube control spool 38 to serve as lubrication fluid in the master clutch 25. A restrictor 37 in the lubrication supply line 36 lowers the pressure of the hydraulic fluid in the lubrication supply line 36 from a system pressure of approximately 250 psi to approximately 60 psi for delivery to the master clutch 25. A second return line 39 returns the lubrication fluid back to the tank 35. The clutch lube control spool 38 is movable between two positions, a high flow position in which full flow of approximately 50 to 60 liters per minute from the restrictor 37 is directed to the master clutch 25 and a low flow position in which the flow is further restricted to deliver approximately 10 to 20 liters per minute to the master clutch 25.

A pressure sensing system 40 controls the movement of the clutch lube control spool 38. A first pilot line 41 delivers a first pilot hydraulic pressure corresponding to the full system pressure to one side of the clutch lube control spool 38 as the first pilot line 41 senses system pressure on the upstream side of the restrictor 37. A second pilot line 42 delivers a second pilot hydraulic pressure to the opposing side of the clutch lube control spool 38 from a double check valve 45 connected via a clutch pilot line 43 to the master clutch supply line 33 and via a brake pilot line 44 to the transmission brake supply line 34. The double check valve 45 serves to supply the greater of the pressures in either the master clutch supply line 33 or the transmission brake supply line 34 to the second pilot line 42 to be applied to the clutch lube control spool 38 in opposition to the force applied from the first pilot line 41.

Whenever the master clutch 25 is modulated, which is defined as a slippage of the respective plates (not shown) within the clutch 25 to permit the transferral of less than full engine power to the transmission 20 and ultimately to the drive wheels 11, 19, heat is generated by the slipping clutch plates (not shown). This generated heat can be dissipated by the application of a high cooling flow of lubrication fluid to the master clutch 25 through the lubrication supply line 36. This high cooling flow is not desirable when the clutch 25 is fully engaged, as the lubrication fluid can be better utilized within the transmission 20 to lubricate interengaged gears (not shown), or when the clutch 25 is fully disengaged, as the high flow of fluid through the clutch 25 creates an internal clutch drag torque due to the increased flow and pressure against the respective plates. As a result, the high flow of lubrication fluid through the clutch 25 can be operative to transmit rotational power to the transmission in opposition to the operation of the transmission brake.

Referring now to FIG. 2, one skilled in the art can see that the operation of the lubrication circuit 30 will deliver a high cooling flow of lubrication fluid to the master clutch 25 only when the clutch 25 is being modulated. The selective manual shifting of the master clutch control spool 28 into the clutch engagement position is selectively operable to modulate the clutch by varying the pressure through the master clutch supply line 33 from approximately zero pressure to substantially full system pressure. Accordingly, the hydraulic pressure in the master clutch supply line while the clutch 25 is being modulated is something less than full system pressure. The clutch pilot line 43 and the interconnected second pilot line 42 deliver a lower pressure to the spring end 38a than the first pilot line 41 which delivers a constant system pressure to the opposing end 38b of the spool 38. The force exerted by the spool spring 48 is incapable of overcoming the difference in pressure and, as a result, the clutch lube control spool 38 is shifted into the high flow position to deliver the required high cooling flow of lubrication fluid to the master clutch 25.

As is best seen in FIG. 3, the full engagement of the master clutch 25 results in a full system pressure in the master clutch supply line 33. The resultant force exerted on the spring end 38a of the clutch lube control spool 38 through the pressure sensing system 40 is equal to the force exerted on the opposing end 38b. This equilibrium allows the spool spring 48 to be effective in shifting the clutch lube control spool 38 to the low flow position and deliver a normal flow of lubrication fluid to the master clutch 25.

Similarly, as depicted in FIG. 4, the movement of the master clutch control spool 28 to the clutch disengaged position switches the flow path of the hydraulic fluid under pressure from the first supply line 32 to the transmission brake supply line 34, after briefly passing through the aforementioned intermediate position, rather than the master clutch supply line 33, which is dumped to tank 35 through the return line 31. The pressure sensing system 40, however, continues to see full system pressure in the second pilot line 42 as the brake pilot line 44 senses the hydraulic pressure in the transmission supply line 34, which is greater than the zero pressure in the master clutch supply line. The opposing pressure on the clutch lube control spool 38 from the first and second pilot lines 41, 42 continues to be in equilibrium, allowing the spool spring 48 to shift the clutch lube control spool 38 in the low flow position.

One skilled in the art will readily realize that the hydraulic lubrication circuit 30 described above is operable to provide a normal flow of lubrication fluid to the master clutch 25 whenever the clutch 25 is not being modulated, but is operable to direct a high cooling flow of lubrication fluid to the master clutch 25 whenever the clutch 25 is being modulated.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a chassis supported above the ground by wheels; drive wheels to provide operative power for movement of said chassis over the ground; an engine mounted on said chassis to provide operative rotational power; a transmission operatively interconnecting said drive wheels and said engine to receive rotational power from said engine and to provide varying speeds of operation of said drive wheels for a given speed of operation of said engine; a master clutch operatively interconnecting said engine and said transmission to control the transfer of rotational power therebetween, said master clutch being movable into a disengaged position in which no rotational power is transmitted to said transmission, a fully engaged position in which substantially all of the rotational power provided from said engine is transmitted to said transmission, and a modulation position in which selectively variable amounts of rotational power is transmitted from said engine to said transmission; a master clutch lubrication circuit for providing a flow of lubrication fluid to said master clutch; a hydraulic system to provide a source of hydraulic fluid under pressure to said master clutch; and a transmission brake operable to arrest the rotational operation of said transmission, said transmission brake being in flow communication with said hydraulic system and being engageable when said master clutch is moved to said disengaged position, an improved lubrication circuit comprising:

a control mechanism operable to deliver a high flow of lubrication fluid internally of said master clutch when said master clutch is being modulated and a low flow of lubrication fluid internally of said master clutch when said master clutch is not being modulated, said control mechanism including a pressure sensing system to sense the pressure applied by said hydraulic system to said transmission brake and to said master clutch, said pressure sensing system being operable to direct said high flow of lubrication fluid internally of said master clutch when less than full hydraulic pressure is applied to either said master clutch or said transmission brake.

2. The tractor of claim 1 wherein said control mechanism includes a clutch lube control spool shiftable in a high flow position corresponding to the direction of said high flow of lubrication fluid to said master clutch and a low flow position corresponding to said low flow of lubrication fluid to said master clutch, said clutch lube control spool being biased toward said low flow position, said pressure sensing system applying a full system pressure constantly to one end of said clutch lube control spool and an application pressure to the opposing side of said clutch lube control spool, said application pressure corresponding to the higher of the hydraulic pressures applied to said transmission brake and said master clutch by said hydraulic system.

3. The tractor of claim 2 wherein the movement of said master clutch into said fully engaged position causes said application pressure to be equal to said full system pressure, allowing said clutch lube control spool to be moved into said low flow position due to the bias exerted thereon.

4. The tractor of claim 3 wherein the movement of said master clutch into said disengaged position and the resulting engagement of said transmission brake causes said application pressure to be equal to said full system pressure, allowing said clutch lube control spool to be moved into said low flow position due to the bias exerted thereon.

5. The tractor of claim 4 wherein the movement of said master clutch into said modulation position causes said application pressure to be less than equal to said full system pressure, allowing said full system pressure to overcome the bias applied to said clutch lube control spool and shift said clutch lube control spool into said high flow position.

6. A tractor comprising:

a chassis supported above the ground by wheels;

drive wheels to provide operative power for movement of said chassis over the ground;

an engine mounted on said chassis to provide operative rotational power;

a transmission operatively interconnecting said drive wheels and said engine to receive rotational power from said engine and to provide varying speeds of operation of said drive wheels for a given speed of operation of said engine;

a master clutch operatively interconnecting said engine and said transmission to control the transfer of rotational power therebetween, said master clutch being movable into a disengaged position in which no rotational power is transmitted to said transmission, a fully engaged position in which substantially all of the rotational power provided from said engine is transmitted to said transmission, and a modulation position in which selectively variable amounts of rotational power is transmitted from said engine to said transmission;

a master clutch lubrication circuit for providing a flow of lubrication fluid to said master clutch;

a hydraulic system to provide a source of hydraulic fluid under pressure to said master clutch;

a control mechanism operable to deliver a high flow of lubrication fluid internally of said master clutch when said master clutch is being modulated and a low flow of lubrication fluid internally of said master clutch when said master clutch is not being modulated;

a transmission brake operable to arrest the rotational operation of said transmission, said transmission brake being in flow communication with said hydraulic system and being engageable when said master clutch is moved to said disengaged position;

a clutch lube control spool shiftable to a high flow position corresponding to the direction of said high flow of lubrication fluid to said master clutch and to a low flow position corresponding to said low flow of lubrication fluid to said master clutch, said clutch lube control spool being biased toward said low flow position; and a pressure sensing system to sense the pressure applied by said hydraulic system to said transmission brake and to said master clutch, said pressure sensing system being operable to shift said clutch lube control spool in response to the hydraulic pressure applied to said transmission brake and said master clutch.

7. The tractor of claim 6 wherein said pressure sensing system applies a full system pressure constantly to one end of said clutch lube control spool and an application pressure to the opposing side of said clutch lube control spool, said application pressure corresponding to the higher of the hydraulic pressures applied to said transmission brake and said master clutch by said hydraulic system.

8. The tractor of claim 7 wherein the movement of said master clutch into said fully engaged position and the movement of said master clutch into said disengaged position, and the resulting engagement of said transmission brake, causes said application pressure to be equal to said full system pressure, allowing said clutch lube control spool to be moved into said low flow position due to the bias exerted thereon.

9. The tractor of claim 8 wherein the movement of said master clutch into said modulation position causes said application pressure to be less than equal to said full system pressure, allowing said full system pressure to overcome the bias applied to said clutch lube control spool and shift said clutch lube control spool into said high flow position.

\* \* \* \* \*